United States Patent [19]
Tu

[11] Patent Number: 5,548,667
[45] Date of Patent: Aug. 20, 1996

[54] IMAGE PROCESSING SYSTEM AND METHOD THEREOF IN WHICH THREE DIMENSIONAL SHAPE IS REPRODUCED FROM TWO DIMENSIONAL IMAGE DATA

[75] Inventor: Peter Tu, Tokyo, Japan

[73] Assignee: Sony Corporation, Tokyo, Japan

[21] Appl. No.: 301,665

[22] Filed: Sep. 7, 1994

Related U.S. Application Data

[63] Continuation of Ser. No. 885,626, May 18, 1992, abandoned.

[30] Foreign Application Priority Data

May 24, 1991 [JP] Japan .................................. 3-149784
Jul. 29, 1991 [JP] Japan .................................. 3-211524

[51] Int. Cl.$^6$ .................................................. G06K 9/00
[52] U.S. Cl. ................................................ 382/285; 382/115
[58] Field of Search .................................... 382/115, 203, 382/285, 286, 288, 291, 199; 348/94; 395/125

[56] References Cited

U.S. PATENT DOCUMENTS

| | | | |
|---|---|---|---|
| 4,206,441 | 6/1980 | Kondo | 382/2 |
| 4,720,869 | 1/1988 | Wadia | 382/2 |
| 4,803,735 | 2/1989 | Nishida et al. | 382/45 |
| 4,922,543 | 5/1990 | Ahlbom et al. | 382/48 |

*Primary Examiner*—Yon J. Couso
*Attorney, Agent, or Firm*—Limbach & Limbach; W. Patrick Bengtsson

[57] ABSTRACT

The image processing system has a unit for photographing an object in two dimensions, a feature extraction unit for extracting features from the two-dimensional image data from the photographing means, and a three-dimensional shape reproduction unit. The feature extraction unit refers to feature points given to the object to extract the features. The three-dimensional shape reproduction unit expresses the object by a dynamic equation, applies force from the feature extraction coordinates to the dynamic model to cause the dynamic model to change shape and supplement depth data, and to thereby reproduce the three-dimensional shape of the object. To increase the speed of the processing, it is desirable to divide the image data of the object into portions with little changes in shape and perform the processing for reproducing the three-dimensional shape for each mode.

4 Claims, 19 Drawing Sheets

UNIFORM PDF (A) NODE Ui
SPRING Kij (B) TWO-DIMENSIONAL
FEATURE POINT
COORDINATES

FRONT VIEW  SIDE VIEW
FIG. 18a 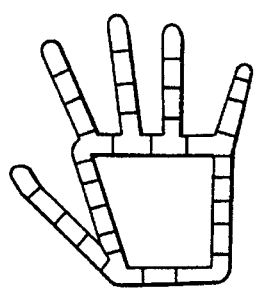 
FIG. 18b 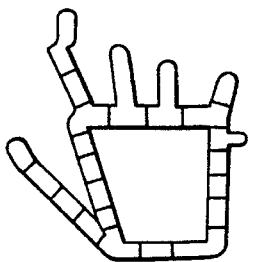 
FIG. 18c 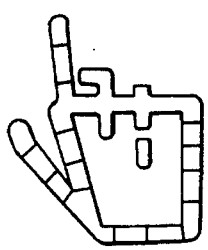 
FIG. 18d 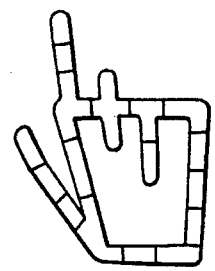 

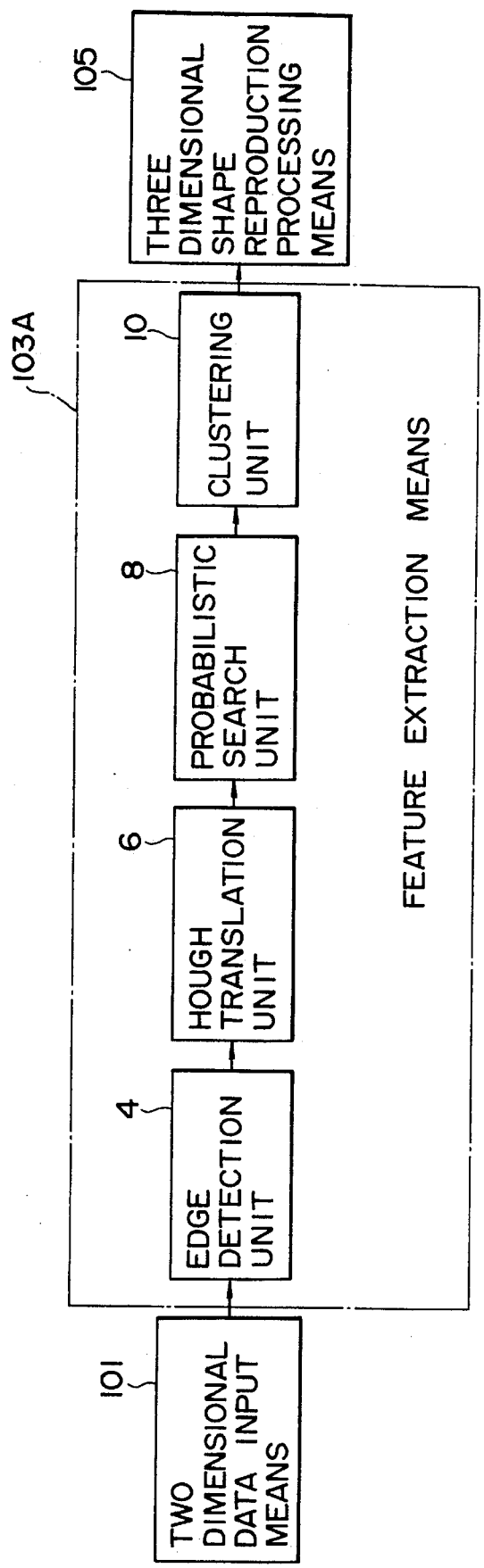

IMAGE PROCESSING SYSTEM AND METHOD THEREOF IN WHICH THREE DIMENSIONAL SHAPE IS REPRODUCED FROM TWO DIMENSIONAL IMAGE DATA

This is a continuation of application Ser. No. 07/885,626 filed on May 18, 1992 now abandoned.

BACKGROUND OF THE INVENTION

1. Field of the Invention

The present invention relates to a method of processing image data and a system using same. More particularly, it relates to a method and system for reproducing a three dimensional shape of an object from a two dimensional image data of the object, a method and system for extracting features of an object, and a method and system for detecting fingers of human hands used as a man-machine interface media.

2. Description of the Related Art

The most common type of human input interface with a computer system involves some type of transducer or actuator which is manipulated by the user, for example, a CRT keyboard, joystick, track ball, and mouse. All of the prior methods in which these input interface devices are employed, however, suffer from a disadvantage in that they require the user to be in physical contact with the hardware, and that a long learning period is usually required before the user becomes proficient with the handling of such an input device. The prior method also suffer from another disadvantage of a narrow scope within which information can be transmitted, for example, a mouse can only send position and motion vectors to a central processing unit in a computer system.

It is desired to photograph an object by a CCD video camera or other photographic means and to reproduce the three-dimensional shape of the object from that photographed image.

Such a method for reproduction of a three-dimensional shape could be applied, for example, to a visual recognition means in the recognition of the motion of a robot hand and its state of grip in an industrial robot.

Further, as another example of application of the method of reproduction of a three-dimensional shape, there is the application to a recognition means in the case of reproduction of the three-dimensional shape of part of the human body, such as the arm, hand, palm, fingers, etc. in the case of use of that body part as a man-machine interface means in a computer system. The human arm, palm, and fingers, as moving objects, are known to function as a more direct and effective man-machine interface than the man-machine interfaces currently in use in computer systems, for example, indirect man-machine interfaces such as a mouse or joystick. A practical real-time method of reproduction of a three-dimensional shape is desired for a moving object like part of the human body, that is, an object which can change in shape.

In the past, the technique used to reproduce a three-dimensional shape of an object was to detect the vertices and edge portions of the object from the two-dimensional image data taken from an object having a three-dimensional shape and to use this data to reconstruct the shape of the object in a noncontradictory manner in a three-dimensional space.

In these methods for reproduction of three-dimensional shapes, however, when there was insufficient edge or other feature data and the feature data could not be clearly obtained and when mistaken data was mixed in the feature data, there was the problem of difficulty in the reproduction of the three-dimensional shape.

If one wishes to deal with mistaken data in the feature data, it is necessary to consider all the combinations of shapes which could be taken and investigate if they make sense with the input data, so there are cases where the amount of calculation becomes huge when combined. The calculation time becomes extremely long. In use for real time processing for an industrial robot or in use using part of the human body as a man-machine interface, for example, it is not possible to satisfy the requirements for realizing the desired three-dimensional shape in real time.

In particular, the two-dimensional image data obtained by photographing an object having a three-dimensional shape by a video camera or other photographic apparatus does not include depth data, so there is difficulty in reproducing a three-dimensional shape.

SUMMARY OF THE INVENTION

An object of the present invention is to provide a method of detecting fingers of a human hand, when used as a direct input interface device, easily correctly and at a high speed, and a system using same.

Another object of the present invention is to provide a three dimensional shape reproduction method and system which can reproduce a three dimensional shape of a moving object in real time.

Still another object of the present invention is to provide a preferred three dimensional shape reproduction method and system to which a general feature extraction method expanded from the above method of detecting fingers of a human hand is applied.

Yet another object of the present invention is to provide a preferred man machine communication system using the above method of detecting fingers of a human hand and the above three dimensional shape reproduction method, easily correctly and a high speed.

Therefore, according to the present invention, there is provided a method of detecting fingers of a human hand, including the steps of: reading the hand and outputting image data of the hand in a form of two-dimensional pixel data; detecting edges of the hand on the basis of the pixel data; parameterizing image lines of the detected edges into a parameter space and accumulating edge pixels in the parameter space, to determine an orientation line of the hand; searching for deep local minimums corresponding to finger tips along the orientation line; and clustering termination points defining the finger tips.

Preferably, the edge detecting step includes calculating a grey level, comparing an absolute of the calculated gradient with a threshold level, and determining a edge when the absolute calculated value is greater then the threshold level.

Also, preferably, the parameterizing and accumulating step includes transforming a rectilinear coordinate system of the detected edges into a polar coordinate system accumulating points on each line, and obtaining average parameters for the 10 best lines to determine the orientation line of the hand.

Preferably, the searching step includes finding the deep local minimums by a random directional decision mechanism, to avoid shallow local minimums.

Preferably, the clustering step includes choosing arbitrary locations in a cluster, assigning the termination pixel of each search to a cluster location on the basis of a least euclidean distance, and determining new cluster locations by computing the centroid of all of the assigned pixels to the cluster.

Further, according to the present invention, there is provided a system for detecting fingers of a human hand by using the above method.

Also, according to the present invention, there is provided a method of extracting features of an object, comprising the steps of: photographing the object and outputting image data of the object in a form of two-dimensional pixel data; detecting edges of the object on the basis of the pixel data; parameterizing image lines of the detected edges into a parameter space and accumulating edge pixels in the parameter space, to determine an orientation line of the object; searching for deep local minimums corresponding to feature points of the object along the orientation line; and clustering termination points defining the feature points.

Preferably, edge detecting step includes the steps of, calculating a two-dimensional gradient of the pixel data each indicating a grey level, comparing an absolute of the calculated gradient with a threshold level, and determining an edge when the absolute calculated value is greater than the threshold level.

Also, according to the present invention, there is provided a system for extracting features of an object.

According to the present invention, there is provided an image processing system having a unit for receiving input two-dimensional image data capturing the movement of an object expressed by a dynamic equation (dynamic model) having springs connected through nodes and expressing dynamic constraints by a spring model, a feature extraction unit for extracting features from the two-dimensional image data and producing feature extraction data, and a unit for applying force on the two-dimensional coordinates of the above-mentioned feature extraction points to a dynamic model of the above-mentioned object to cause the dynamic model to change in shape and supplement depth data so as to reproduce the three-dimensional shape of the above-mentioned object.

Preferably, the three-dimensional shape reproduction unit divides the image data of the object into partial regions with little change in shape and performs the above-mentioned three-dimensional shape reproduction calculation for each mode for each partial region.

The dynamic constraints of the object are expressed by a spring model and the three-dimensional shape of the object is reproduced by solving the dynamic equation of the object from the feature points of the two-dimensional image of the object.

In particular, it is possible to supplement depth data by applying force from the two-dimensional coordinates of the above-mentioned feature extraction points to the model of the object so as to cause the model of the object to change in shape and it is possible to precisely reproduce the three-dimensional shape of the object in a short time.

By dividing the image data of the object into partial regions with little change in shape and performing the above-mentioned three-dimensional shape reproduction calculations for each mode of each partial region, the three-dimensional shape reproduction processing can be performed at a further higher speed.

Also, according to the present invention, there is provided a method of reproducing a three dimensional shape of an object. The above method of extracting features of object can be applied to the feature extraction unit and/or the feature extraction step.

BRIEF DESCRIPTION OF THE DRAWINGS

The above objects and other objects and the above features and features of the present invention will be described in more detail with reference to the accompanying drawings, in which

FIGS. 18a to 18d are views showing a model of the feature extraction of the human palm and fingers used in the processing in FIG. 17.

FIG. 21 is a view illustrating an image processing system of a third embodiment of the present invention.

DESCRIPTION OF THE PREFERRED EMBODIMENTS

A method and system (apparatus) for detecting fingers of a human hand, as a first embodiment of an image processing method and system of the present invention, will be described.

Figure 1:
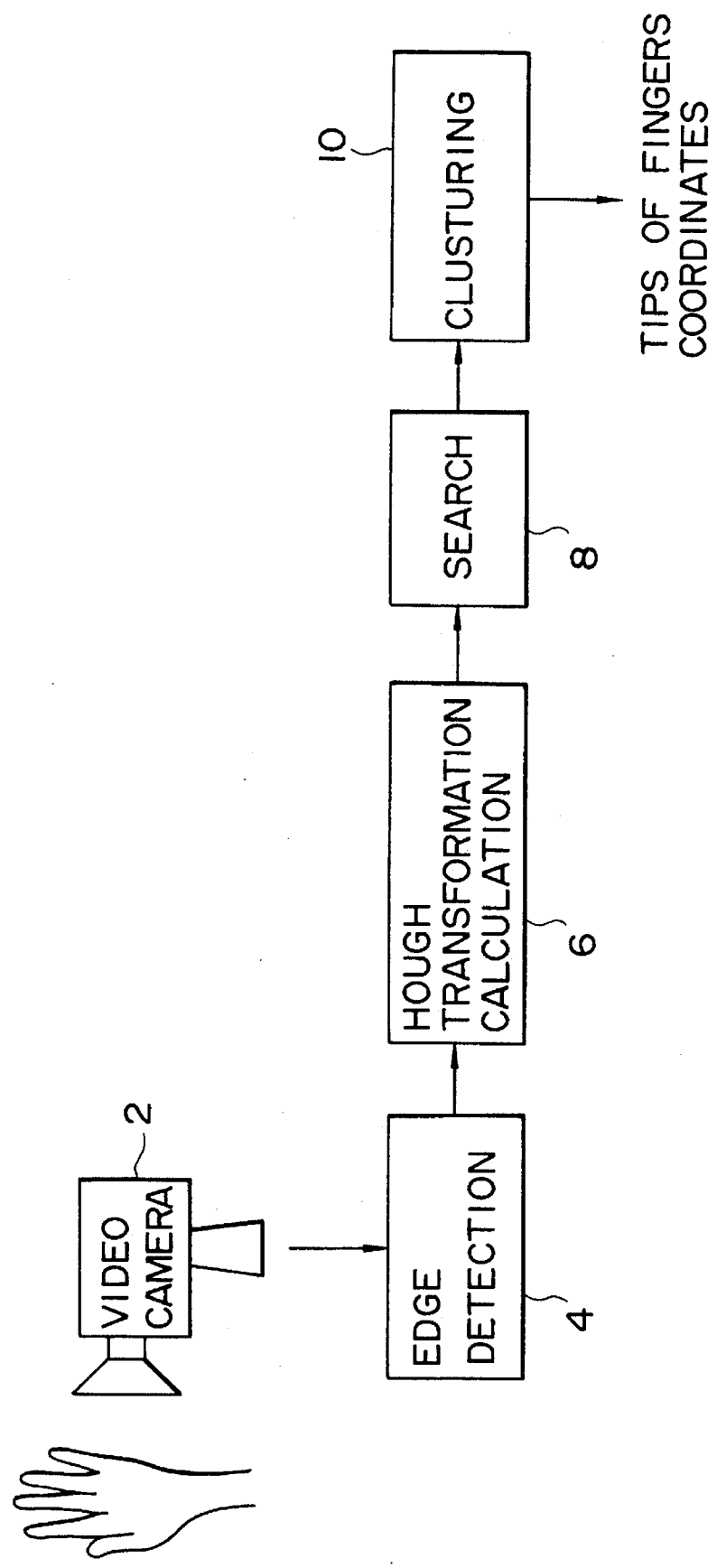
FIG. 1 is a block diagram of an image processing system for detecting fingers of aa human hand, according to the present invention.
Figure 2:
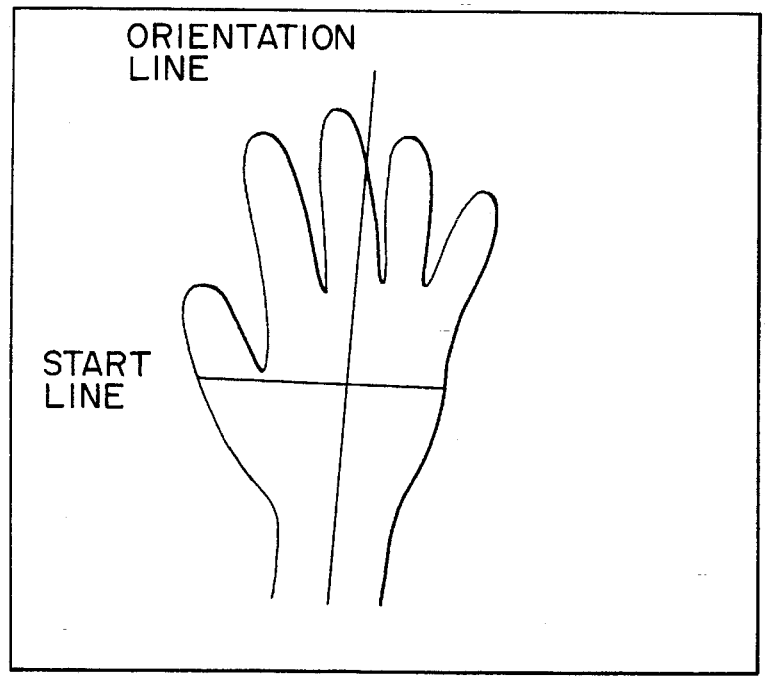
FIG. 2 is a view of a hand on an enlarged scale, for explaining a determining of an orientation line of the hand and the relationship between the orientation line and a start line when searching for finger tips.
Figure 3:
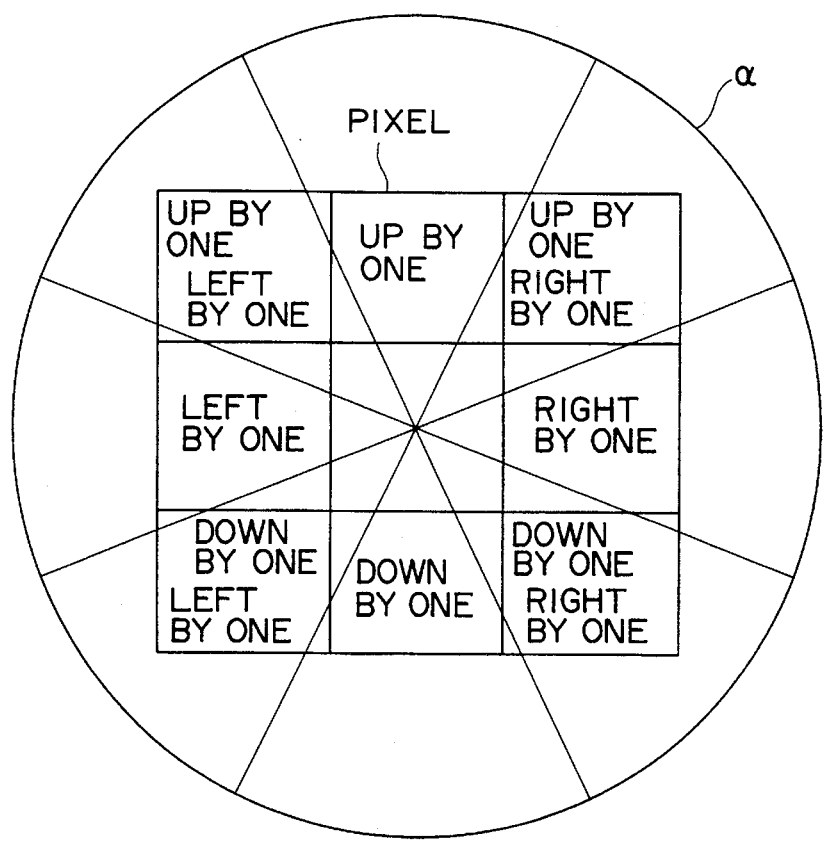
FIG. 3 is a view of a direction mechanism for finding deep local minimums.
Figure 4:
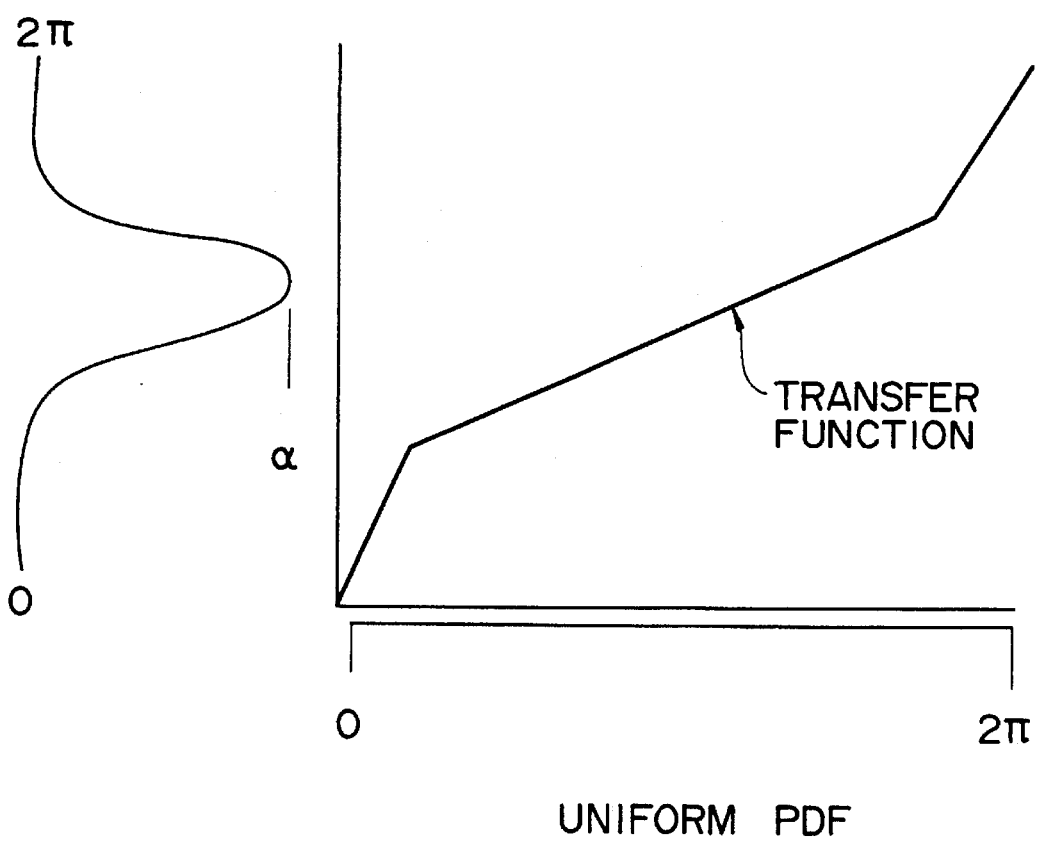
FIG. 4 is a graph explaining the relationship between a uniform probability and a transfer function.

FIG. 1 is a block diagram of a system for detecting fingers of a human hand, FIG. 2 is an enlarged view showing a relationship between orientation directions of the fingers and a search start line when finger tips are searched. FIG. 3 is a view showing a direction defining mechanism when searching local minimums, and FIG. 4 is a graph showing a relationship between a uniform probability distribution function PDF and a transfer function.

The finger tips can be used to directly point to and/or coordinate an item or items displayed by a display unit. The image processing system includes a standard video camera 2, an edge detection unit 4, a Hough Transformation calculation unit 6, a probabilistic searching unit 8, and a clustering unit 10.

The camera 2 reads a human hand 12, and the clustering unit 10 outputs coordinates of the finger tips. The edge detection unit 4, the Hough Transformation calculation unit 6, the probabilistic searching unit 8, and the clustering unit 10 are operated by a digital computer system.

The system for detecting a finger tips of a human hand, which is realized by a digital computer, carries out the following operations, shown in FIG. 5 to FIG. 10.

Figure 5:
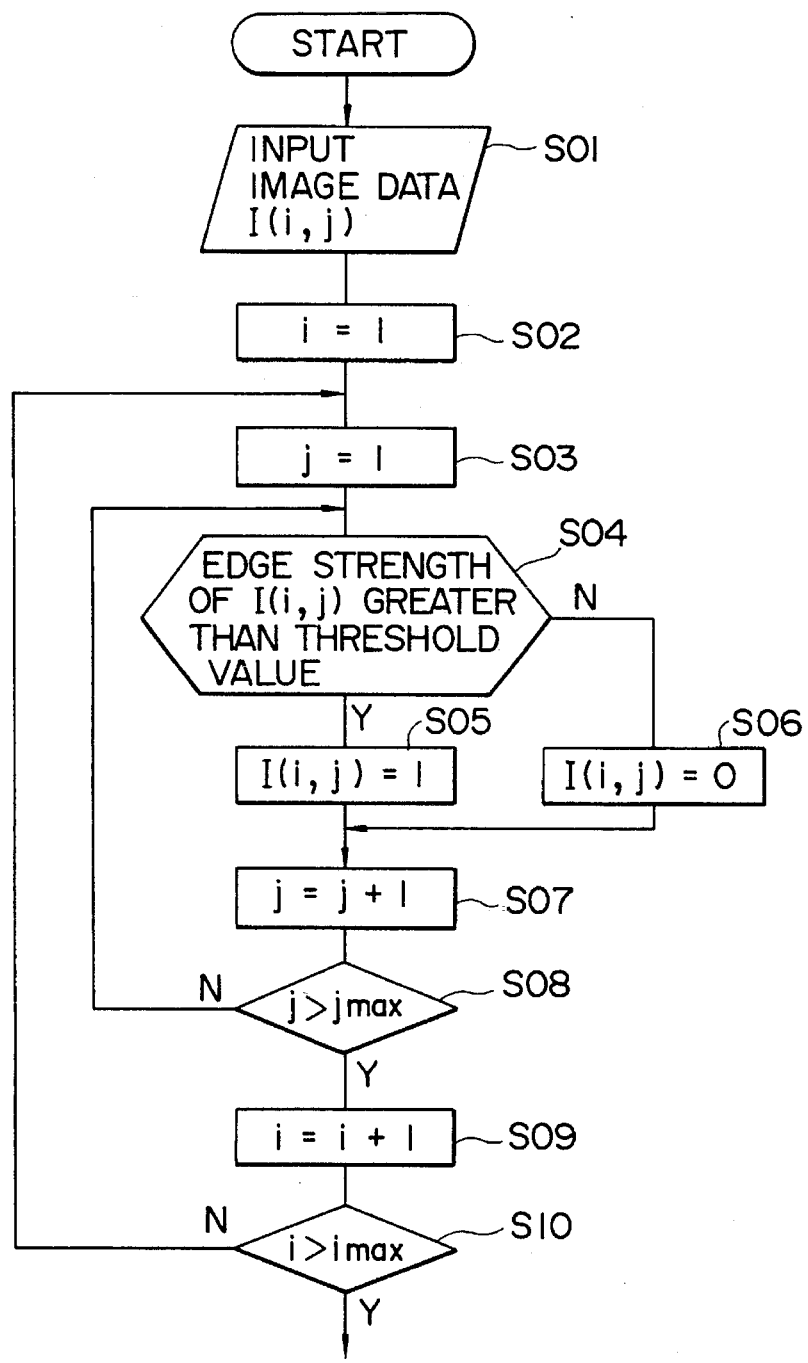
FIG. 5 is a flow chart explaining an edge detection processing.
Figure 6:
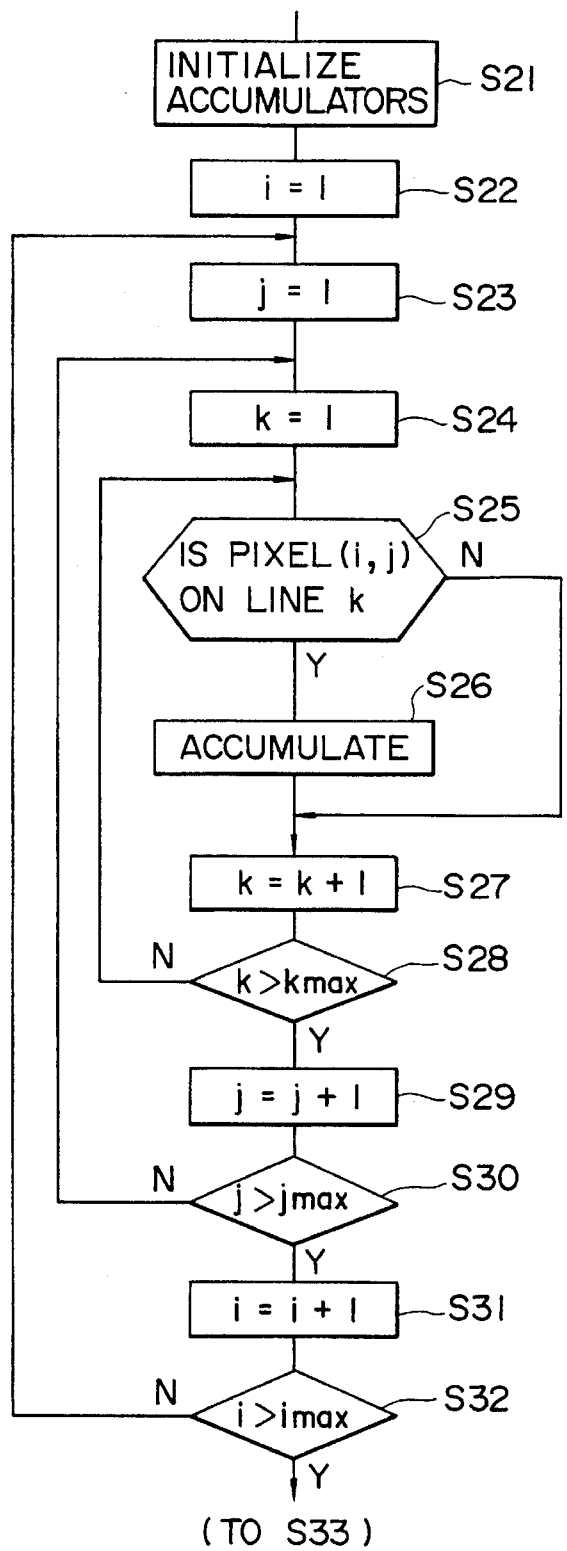
FIGS. 6 and 7 are flow chart explaining a Hough translation processing.
Figure 7:
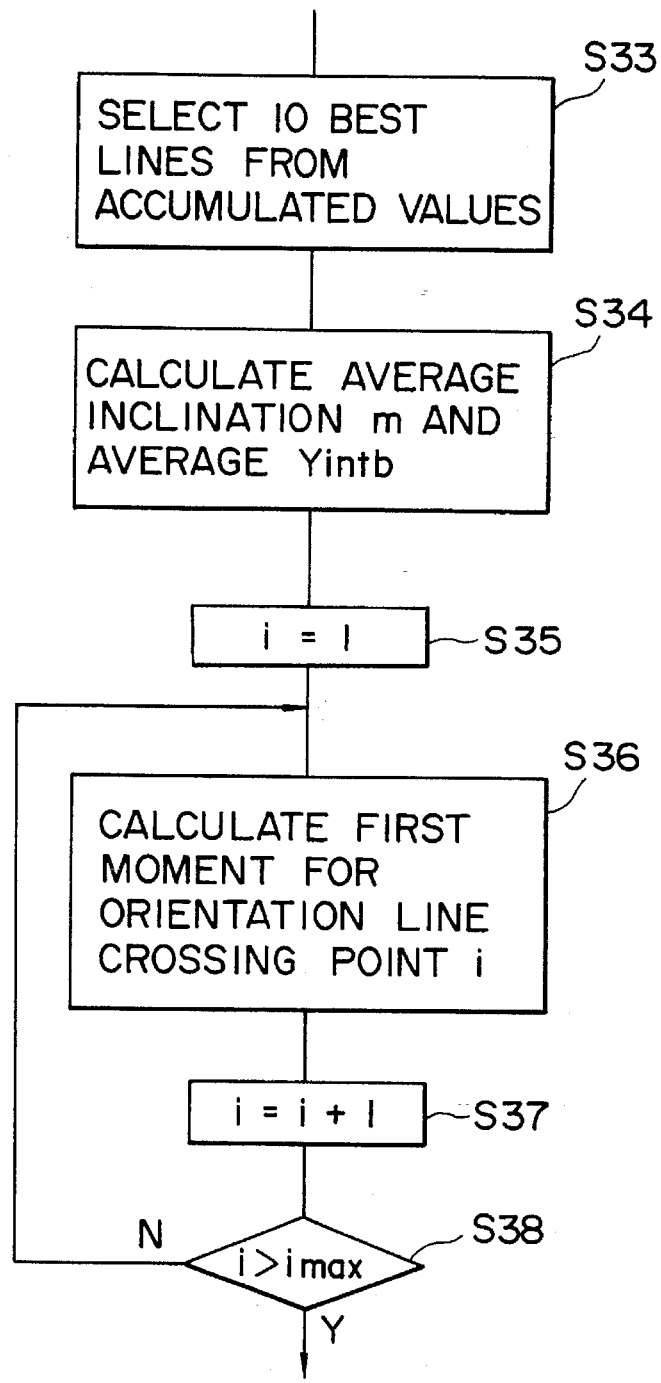
Figure 8:
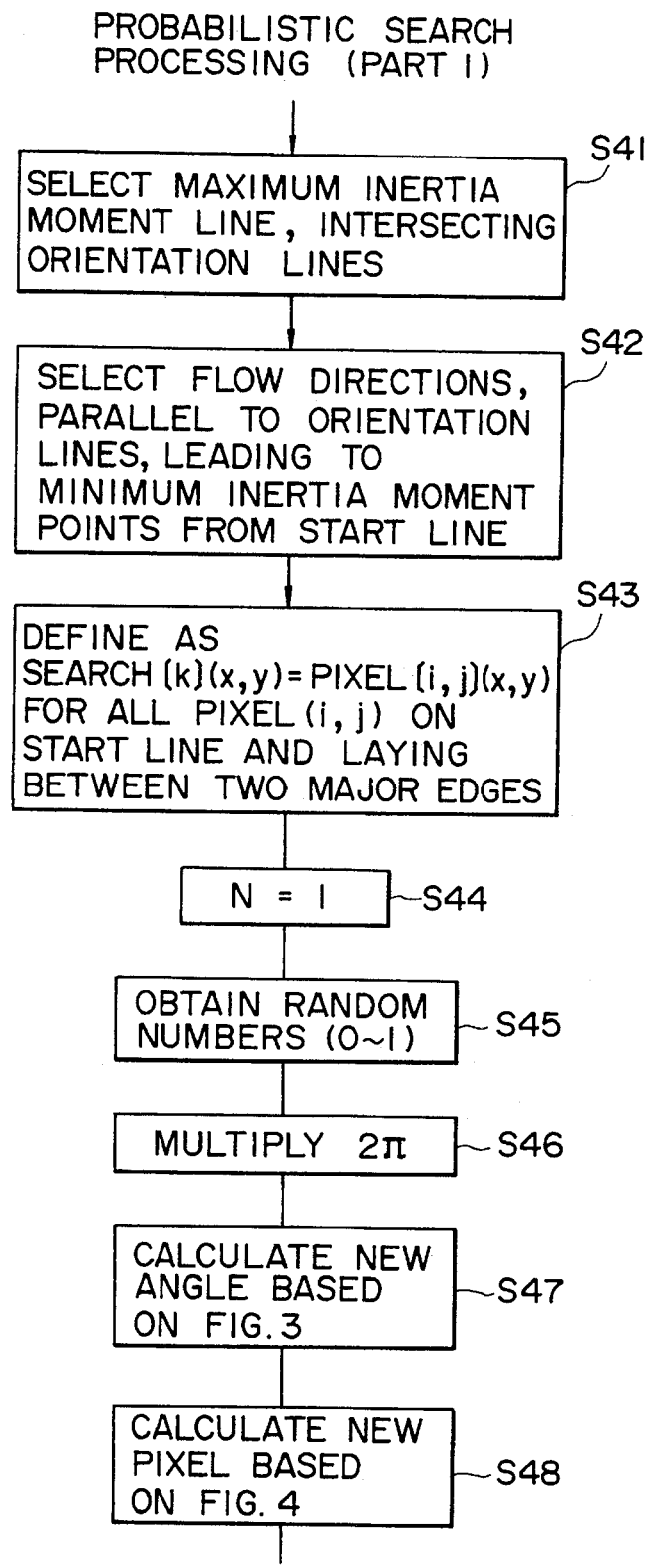
FIGS. 8 and 9 are flow chart explaining a probabilistic search processing.
Figure 9:
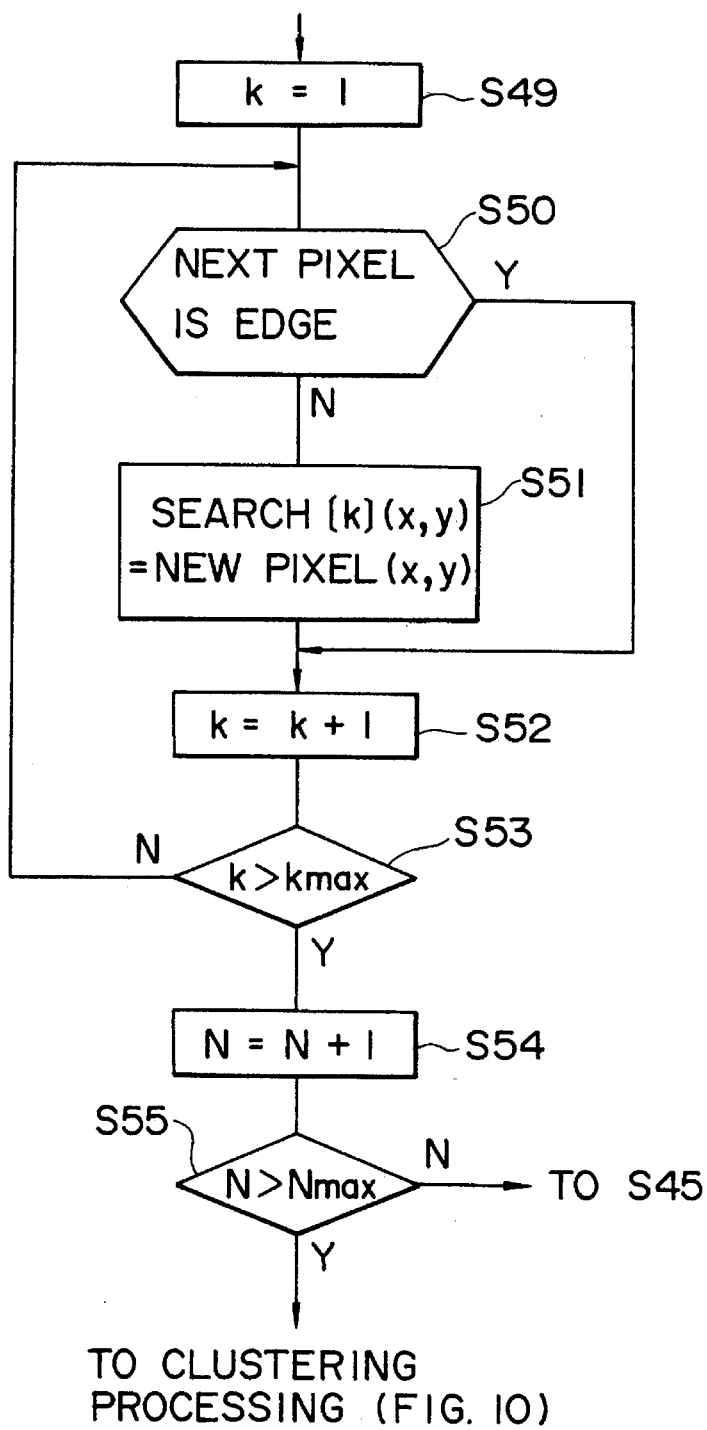
Figure 10:
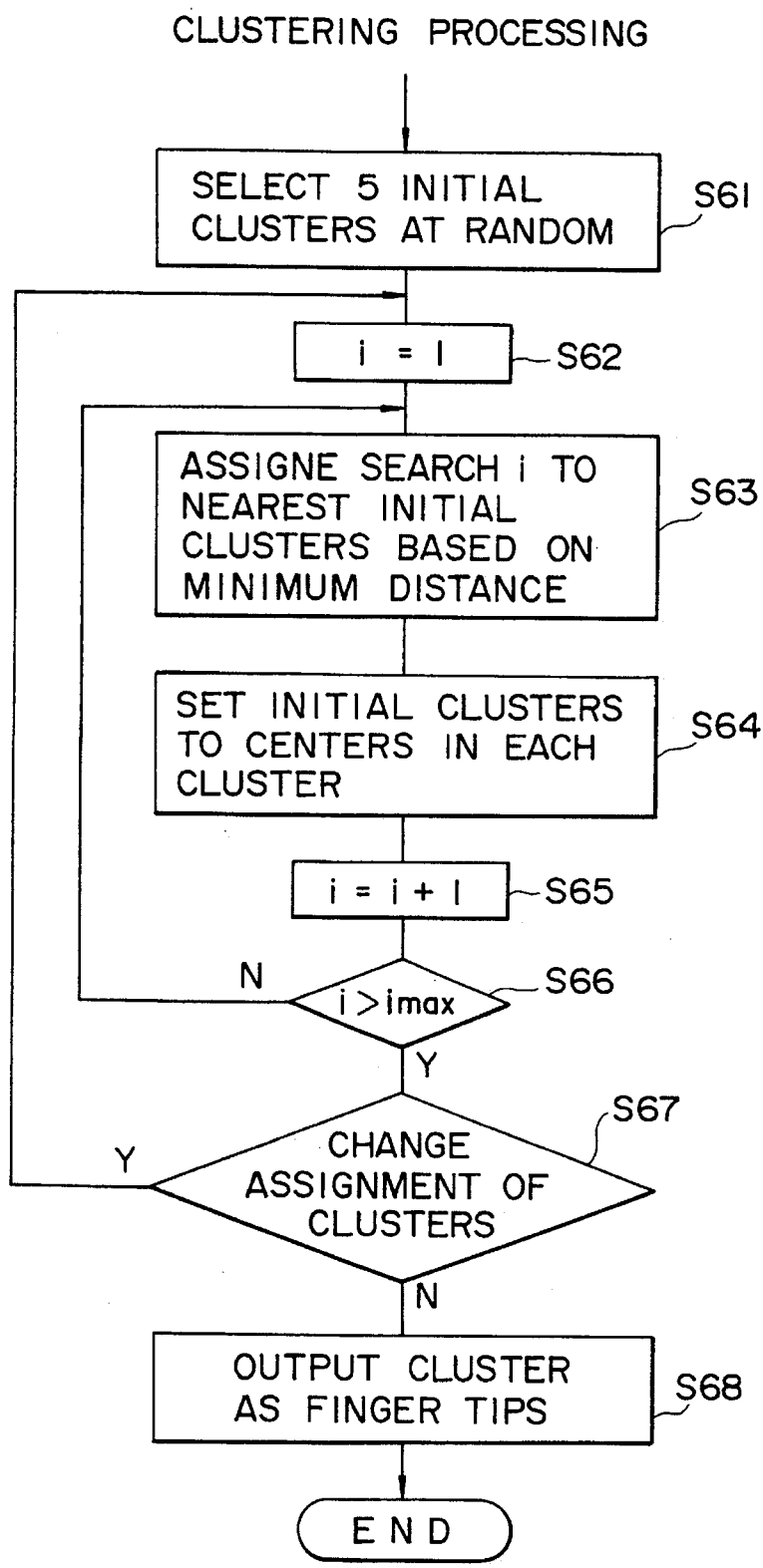
FIG. 10 is a flow chart explain a clustering processing.

FIG. 5 is a flow chart showing an image data input processing of the video camera 2, and an edge detection processing of the edge detection unit 4. FIGS. 6 and 7 are flow charts showing a Hough Translation processing in the Hough Translation calculation unit. FIGS. 8 and 9 are flow charts showing a probabilistic search processing in the probabilistic search unit 8. FIG. 10 is a flow chart showing a clustering processing in the clustering unit 10.

Tables 1 to 4 are partial program codes (pseudo codes) performing the above processing in the digital computer. Due to the limitation of the illustration, the program codes are divided, but, the program codes are processed sequentially.

Table 1 shows a program codes for initializing accumulators used in the Hough Translation processing, Table 2 shows a program code for finding edges image data, Table 3 shows a program code for searching ten (10) best lines in the Hough Translation processing, and Table 4 shows a program code for outputting position γm and tm where this positions are the maximum value of the accumulators as probabilistic candidates for the image lines, in the probabilistic search processing.

TABLE 1

```
/*initialize the accumulators*/
For(r=rmin to rmax){
    for(t=tmin to tmax){
        accum[r][t]=0
    }
}
```

TABLE 2

```
/*search through the image for edges*/
for(x=xmin to xmax){
    if (p[x][y]=edge){
        /*determine all possible lines through x,y*/
        for(t=tmin to tmax){
            r=x*sin(t)+y*cos(t)
            /*increment accumulator*/
            if(rmin < r < rmax){
                r=(r-rmin)/deltar
                accum[r][t]++
            }
        }
    }
}
```

TABLE 3

```
/*search for the 10 best lines*/
max=0
rm=0
tm=0
for(i=1 to 10){
    max=0
    rm=0
    tm=0
    for(r=rmin to rmax){
        for(t=tmin to tmax){
            if(accum[r][t] > max){
                max=accum[r][t]
                rm=r
                tm=t
            }
        }
    }
}
```

TABLE 4

```
/*report rm an tm as probable candidate for an image line*/
    print(rm, tm)
    accum[rm][tm]=0
    }
exit
```

As shown in step S01 in FIG. 5, the camera 2 including a charge-coupled device (CCD) reads the hand, digitizes an image of the hand, and outputs two-dimensional picture data, i.e., edge pixel data I(i,j), where I(i,j) is the grey level intensity at the point (i,j) in the image, of the hand to the edge detection unit 4.

As shown in step S02 to S10 in FIG. 5, the edge detection unit 4 detects the edges of the hand by a gradient method edge detection algorithm. Namely, the edge detection unit 4 calculates the gradient $\nabla I(i,j)$.

$$\nabla I(i,j) = i \frac{\partial}{\partial x} I(i,j) + j \frac{\partial}{\partial y} (i,j) \quad (1)$$

The edge detection unit 4 determines the edges of the hand in the following manner:

if $|\nabla I(i,j)| > T$ then pixel datal (i,j) is an edge pixel.
where, T is a given threshold level.

The edge detection unit 4 determines whether or not the pixel is an edge pixel, when the pixel is deemed as the edge pixel the edge detection unit 4 sets as the edge pixel I(i,j)=1, otherwise, the pixel I(i,j)=0. The edge detection unit 4 carries out this edge detection processing to all image coordinates (i=1 to i max, j=1 to j max).

As shown in FIGS. 6 and 7, the Hough translation calculation unit 6 initializes accumulators (step S21 in FIG. 6, Table 1), accumulates values in the accumulators (steps S22 to S32, Table 2), and extracts the ten best lines from the values of the accumulators (step S33, Table 3).

As shown in FIG. 2, the hand is made up of approximately 10 lines that rum roughly in parallel to one another, and by averaging the slopes and the Y-intercepts of these lines (step S34 in FIG. 7), it is possibly to finally obtain an orientation line that bisects the hand and runs parallel to the fingers.

In the Hough Transform method, all possible image lines are parameterized into a parameter space, accumulators in the parameter space keep track of all edge pixels that could be part of each line, and the lines having the greatest amount of pixels are chosen as image lines. The implementing of the Hough Transformation will be described below:

Any given line euclidean two space can by defined as:

$$x\sin(\theta)+y\cos(\theta)=\rho \qquad (2)$$

Where x and y are coordinates of any point on the given line in a rectilinear coordinate system, $\theta$ and $\rho$ define the point on the line that is closest to the origin in a polar coordinate system. In this implementation all possible lines that can pass through the image space are vector quantized to values of $\rho$ and $\theta$ that range between $\rho$ min-$\rho$ max and $\theta$ min-$\theta$ max.

For each edge point x,y in the image, all of the possible lines are determined by varying $\theta$ and determining the resulting $\rho$ based on the given x and y.

For each line that is determined, an accumulator for that line is incremented (steps S26 to S27 in FIG. 6, Table 2).

After all the edge points are processed, the accumulators are searched and the lines with the highest accumulator values are chosen (step S33 in FIG. 33, Table 3).

To convert the representation of the line to y=mx+b form, the following equations are used:

$$m=\sin\theta/\cos\theta \qquad (3)$$

$$b=\rho/\cos\theta \qquad (4)$$

an inertia moment m and b are determined for all of the recommended (candidated) lines, an m average and b average are then calculated, and this becomes the orientation line as shown in FIG. 2.

Once the orientation of the hand is determined, in the probabilistic searching unit 8, multiple searches are carried out in order to find "deep" local minimum which correspond to the finger tips. The start positions of these searches are along a line perpendicular to the orientation line.

In FIGS. 8 and 9 showing the operation of the probabilistic search unit 8, the probabilistic search unit 8 determines lines intersecting the orientation lines and having the largest inertia moment, and determines them as orientation lines of the hand. Once the orientation lines are determined, the probabilistic search unit 8 carries out a plurality of search operations to find "deep local minimums". The deep local minimum correspond to the finger tips.

The intersection of the start line and the orientation line is determined by finding the position of the greatest moment with respect to the orientation line, this corresponds to the thickest part of the and just below the thumb.

Each search tends toward the direction of the hand orientation. A search cannot cross am edge boundary.

In order to avoid shallow local minimums, the search is given a random directional decision mechanism that is biased towards the finger tips.

Each search has a step size of one pixel and a total of 400 steps are allowed, as shown in Table 1 to Table 4.

Due to the random nature of the path decision mechanism, shallow local minimums are easily avoided, although the finger tips are like traps.

The structure of the directional decision mechanism will be described with reference to FIGS. 3, 4, 8 and 9.

For every given step, an angle $\alpha$ is determined from a random number generator with a given probability distribution, and for the given angle, the next pixel to be entered is determined. If the next pixel is an edge pixel then the search remains in the initial pixel location of the duration of the step.

The random number generator has a uniform probability distribution with a range of from 0 to 1 (step S45 in FIG. 8). As shown in FIG. 4, in order to convert this distribution to a desired probability distribution function: PDF, a cumulative distribution function: CDF of the desired PDF is determined. If ux is the uniform random variable and F(x) is the CDF of the desired PDF then $dx=F^{-1}(ux)$ will be a random variable with the desired PDF.

Then dx is multiplied by $2\pi$ in order to get angle values, and a new pixel is detected on the basis of the relationship shown in FIG. 4 (steps S46 to S48).

The choice of the PDF is made so as to emphasize the direction of orientation. In this case, a simple distribution was attempted as seen in the Figure. There are an infinite number of possible distributions and the choice of distribution could enhance or hinder the performance of the search.

After all of the searches are terminated, in the clustering unit 10, a clustering algorithm such as the "K-Means" algorithm is used to cluster the location of the search elements, based on the fact that there are five clusters. These cluster locations determine the position of the finger tips.

The implementing of the "K-Means" algorithm in the clustering unit 10 will be described with reference to FIG. 10.

Step S61: The clustering unit 10 chooses $z1, z2, z3, z4, z5$ arbitrarily, where $zi$ is the location of the i-th cluster.

Steps S62 and S63: The clustering unit 10 assigns the termination pixel of each search to a cluster location based on a least euclidean distance.

Steps S64 to S66: The clustering unit 10 determines the new cluster locations by computing the centroid of all of the assigned pixies to the cluster.

Step S67: If any cluster locations change, the clustering unit 10 returns its operation to the operation of step S62.

Step S68: A test image of a hand is used and the algorithm is able to determine the position of the finger tips.

As stated above the use of a different PDF could drastically change the performance of the search, and to improve the run time, and adaptive step size could be implemented using scale space techniques.

The effect of noise on the Hough Transform is relatively minor, but background edges should be removed by preprocessing. If the S/N ration is high, then the PDF of the searches should be altered to allow for a greater degree of back tracking.

An advantage of this type of interface is that the user does not have to develop the dexterity required for easy use of a manual input device. Further, the amount of information transmitted by hand movements is very high, and thus this interface can be used with a wide variety of applications.

The use of the above method and system is not limited by hand size and hand shape, and therefore, anyone can easily operate such a method and system.

The above mentioned method and system can be applied to other objects, for example, a hand of an industrial robot to recognize the state of grip.

Alternatively, the above mentioned method can extract features of the object and thus can be applied to an image processing method and system in which a feature extraction is carried out to reproduce and/or recognize the object.

A second embodiment of the present invention will be described. The second embodiment pertains to a three dimensional shape reproduction method and system.

Figure 11:
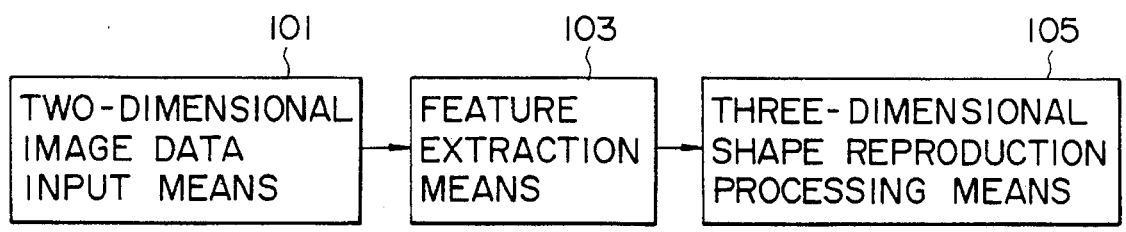
FIG. 11 is a view showing the constitution of an embodiment of the image processing system of the present invention.

FIG. 11 is a view of the constitution of the second embodiment of the image processing system of the present invention.

The image processing system has a two-dimensional image data input means 101, a feature extraction means 103, and a three-dimensional shape reproduction processing means 105.

The two dimensional image data input means 101 may be realized, for example, by a CCD video camera, while the feature extraction means 103 and the three-dimensional shape reproduction processing means 105 may be realized by computer systems.

Figure 12:
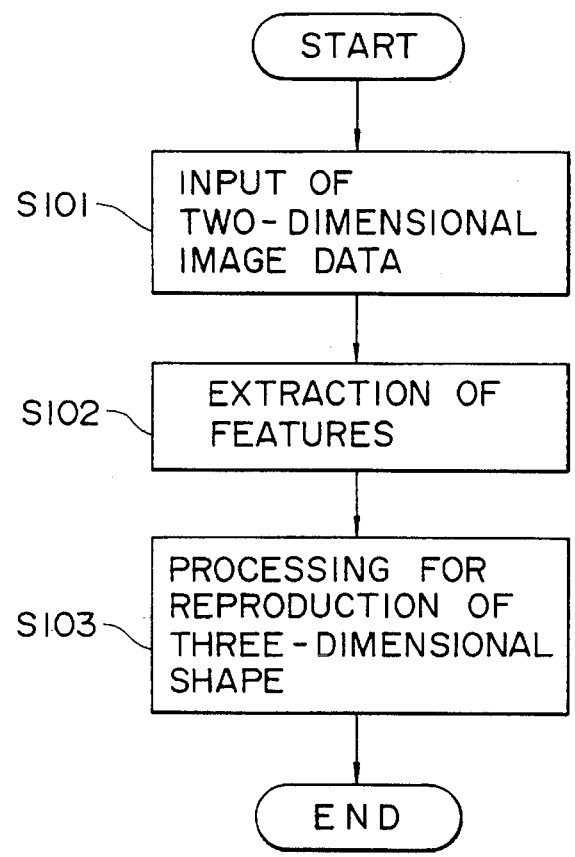
FIG. 12 is a flow chart showing the processing of the basic operation of the image processing system shown in FIG. 11.

FIG. 12 is a flow chart showing the basic operation of the image processing system shown in FIG. 11.

Step S101: The two-dimensional image data input means 101, for example, is a CCD video camera which photographs the object in a two-dimensional state. The two-dimensional image data of the object photographed by the video camera in applied to the feature extraction means 103.

Step S102: The feature extraction means 103 extracts features from the two-dimensional image data input from the video camera and outputs the two-dimensional coordinates of the feature points.

As the method of feature extraction, it is possible to make use of various methods known in the past. As such a feature extraction method, for example, there are the method of detection of the coordinates of the feature points by detecting and discriminating colors of markers used to mark in advance the feature points of the object, the method of detecting the coordinates of the feature points by detecting the edges of the objects and discriminating by local shapes, etc. Any of these may be used in the feature extraction means 103 of the present invention.

The two-dimensional coordinates of the feature points extracted in the feature extraction means 103 are applied to the three-dimensional shape reproduction processing means 105.

Step S103: In the three-dimensional shape reproduction processing means 105, the two-dimensional coordinates of the feature extraction points from the feature extraction means 103 is used to reproduce the three-dimensional shape of the object based on the dynamic equation (dynamic model) of the object.

As mentioned above, in the image processing system of the present invention, the dynamic constraints of the object are expressed by a spring model and the three-dimensional shape of the object is reproduced by solving the dynamic equation of the object using the feature points of the two-dimensional image of the object.

Figure 13:
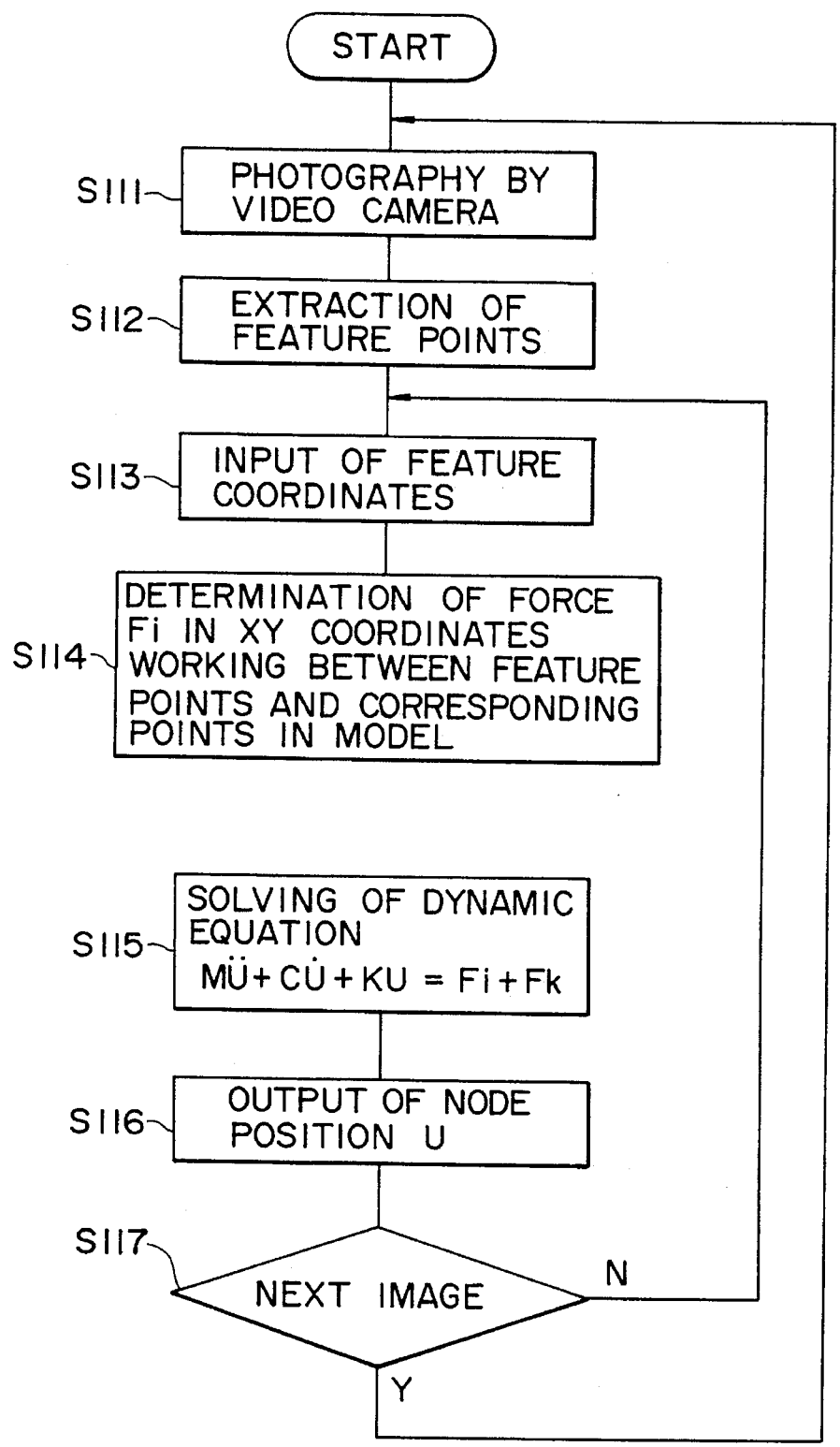
FIG. 13 is a flow chart showing the processing of a first embodiment of the image processing system shown in FIG. 11.

FIG. 13 is a flow chart of the detailed content of processing by the processing operation of the image processing system of the present invention, in particular the operation of the first mode of the three-dimensional shape reproduction processing method in the three-dimensional shape reproduction processing means 105.

Figure 14:
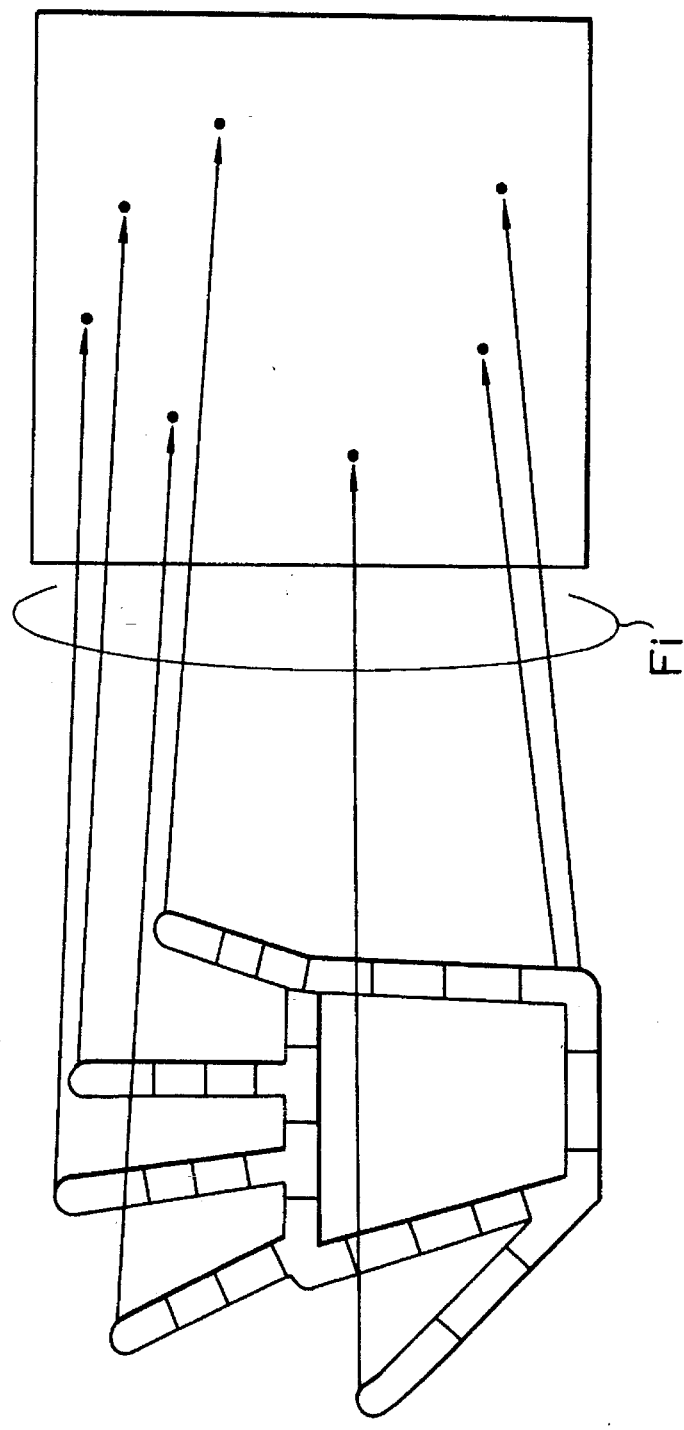
FIG. 14 is a view showing the motion of a human palm and fingers as an example of an object used in the processing in FIG. 13.

FIG. 14 is a view showing the image data of the human palm and fingers as a man-machine interface means in a computer system and the results of the extraction of features as a specific example of the object of the three-dimensional shape reproduction in FIG. 13.

The procedure of step S111 and step S112 in FIG. 13 is the same in content as the procedure of step S101 and S102 explained using FIG. 12. Steps S113 to S116 show the detailed operations in the three-dimensional shape reproduction processing means 105.

Below, an explanation will be given of the content of the three-dimensional shape reproduction processing after the processing operation shown in step S113 shown in FIG. 13.

First, an explanation will be made of the general theory of a dynamic equation of an object.

In general, a dynamic equation of an object is expressed by equation 5.

$$M\ddot{U}+C\dot{U}+KU=F \quad (5)$$

where, F denotes the force,

M denotes the mass,

C denotes the damping coefficient,

K denotes the stiffness, and

U denotes a node position.

The dot (.) above the node position U shows one-stage differentiation, while the double dots (..) show two-stage differentiation.

The node position U for each node is expressed as a vector $U=(U_x, U_y, U_z)$ of the X, Y, and Z components in a three-dimensional coordinate system. If the number of nodes is n, then there are 3n components of the node position U as shown in equation 6.

$$U = \begin{bmatrix} U_{x1} & U_{y1} & U_{z1} \\ U_{x2} & U_{y2} & U_{z2} \\ . & . & . \\ . & . & . \\ U_{\epsilon} & U_{yi} & U_{zi} \\ . & . & . \\ . & . & . \\ U_{xn} & U_{yn} & U_{zn} \end{bmatrix} \quad (6)$$

A virtual mass M is given to the node position U and a friction (damping) coefficient C is given for stabilizing the system.

For example, as illustrated in FIG. 14, the joint portions of the palm and fingers etc. are expressed as the node positions U in three-dimensional space and the portions of the bones of the fingers are expressed as the springs K.

The mass M, the damping coefficient C, and the stiffness K are respectively expressed by 3n×3n matrices. One of the mass matrices M, that is, M1, one of the damping coefficient matrices C, C1, and one of the stiffness matrices K, K1, expressed by the 3n×3n matrices, are shown in equation 7 to equation 9.

$$M1 = \begin{bmatrix} M_{11} & M_{12} & . & . & . & M_{1n} \\ M_{21} & M_{22} & . & . & . & M_{2n} \\ . & . & & & & . \\ . & . & & & & . \\ . & . & & M_{ij} & & . \\ . & . & & & & . \\ . & . & & & & . \\ M_{n1} & M_{2n} & . & . & . & M_{nm} \end{bmatrix} \quad (7)$$

$$C1 = \begin{bmatrix} C_{11} & C_{12} & . & . & . & C_{1n} \\ C_{21} & C_{22} & . & . & . & C_{2n} \\ . & . & & & & . \\ . & . & & & & . \\ . & . & & C_{ij} & & . \\ . & . & & & & . \\ . & . & & & & . \\ C_{n1} & C_{2n} & . & . & . & C_{nm} \end{bmatrix} \quad (8)$$

$$K1 = \begin{bmatrix} K_{11} & K_{12} & . & . & . & K_{1n} \\ K_{21} & K_{22} & . & . & . & K_{2n} \\ . & . & & & & . \\ . & . & K_{ij} & & & . \\ . & . & & & & . \\ . & . & & & & . \\ K_{n1} & K_{2n} & . & . & . & K_{nm} \end{bmatrix} \quad (9)$$

In the embodiment, as the force F shown in the above-mentioned equation 1, the force vector $F_i$ and the force vector $F_k$ are introduced.

The nonlinear internal force vector $F_k$ is a quantity defined by the relative position of the node and is defined as a nonlinear value. The nonlinear internal force $F_k$ expresses the nonlinear motion (change in shape) which cannot be expressed by a spring model of the object alone and may also be called "knowledge of the way a shape changes".

The force vector $F_i$ shows the external force vector $F_i$ found from the two-dimensional feature extraction coordinates extracted in the feature extraction means 103.

Equation 10 can be obtained by modifying equation 5 using the nonlinear internal force vector $F_k$ and the external force vector $F_i$ found from the two-dimensional feature extraction coordinates.

$$M\ddot{U} + C\dot{U} + KU = F_i + F_k \quad (10)$$

The operation of the three-dimensional shape reproduction processing means 103 will now be explained with reference to FIG. 3.

Step S113: The three-dimensional shape reproduction processing means 105 receives as input the two-dimensional feature extraction coordinates of the feature extraction in the feature extraction means 103.

Step S114: The three-dimensional shape reproduction processing means 105 calculates and determines the external force vector $F_i$ obtained from the above-mentioned two-dimensional feature extraction coordinates in the X, Y coordinates, that is, a two-dimensional space, which acts between the two-dimensional feature extraction coordinates input and the corresponding points in the dynamic model of the object. The external force vector $F_i$ obtained from the two-dimensional feature extraction coordinates in general means the force like a spring placed on the plane parallel to the X and Y plane without a depth component and is expressed as a model in which a spring is placed between the feature points and the corresponding nodes.

Step S115: In the present embodiment, the external force vector $F_i$ obtained from the two-dimensional feature extraction coordinates is applied to change the shape of the model of the object and the dynamic equation shown in equation 10 is solved. Usually, when solving the dynamic equation of the equation 10 convergence calculation is performed using known numerical calculation using a computer.

Step S116: When equation 10 is solved by convergence calculation, the convergence calculation is terminated under suitable conditions in consideration of the number of repetitions of the calculation, the error with the previous results of the node position U, etc.

Step S117: When assuming on-line real time processing, for example, moving image data is input to the feature extraction means 103 in continuous video frames from a video camera serving as the two-dimensional image data input means 101 so as to extract the features. When the three-dimensional shape reproduction processing means 105 performs the reproduction of the three-dimensional shape at this time, the above-mentioned processing is repeated.

As a result, node positions U are continuously output from the three-dimensional shape reproduction processing means 105 corresponding to the continuous video frames.

As shown in the present embodiment, when dealing with an object photographed as a moving image, such as the human palm or fingers etc. as shown in FIG. 14, when solving the dynamic equation shown in equation 10 as a differentiation equation in the video frames in the image signal processing, it is possible to use the node positions U obtained even in the previous video frame as the initial value of the node position U, so when the node positions are not that much different among adjoining video frames, it is possible to speed up the convergence calculation of equation 10.

Further, even when there are several solutions to the dynamic equation shown in equation 10, the solution closest to the solution of the previous frame may be selected to obtain the correct solution.

In addition, even if several of the feature points are hidden and are missing in the feature extraction data in the feature extraction means 103 or mistaken data is mixed in due to noise or other reasons, the dynamic system tries to settle at a position when the energy state of the dynamic model is stable, so there is the advantage that the most reasonable solution is output.

FIG. 14 is a view schematically showing the results of the present embodiment of photographing the human palm and fingers by a video camera, extracting the two-dimensional feature extraction points by the feature extraction means 103, and reproducing a three-dimensional shape by the three-dimensional shape reproduction processing means 105 from the results.

For the feature extraction in the feature extraction means 103, for example, red marks are made on the bottom of the palm and the tips of the fingers (claws).

The embodiment of the present invention, as mentioned above, expresses the object by a dynamic model, photographs the object by a video camera or other two-dimensional image data input means 101, extracts the features of the two-dimensional image data by the feature extraction means 103, inputs the feature extraction points to the three-dimensional shape reproduction processing means 105, calculates as force the input two-dimensional feature data in the three-dimensional shape reproduction processing means 105, and makes this act on the model, so even when there is little feature data, it is possible to reproduce the three-dimensional shape if the system of the object is stable.

Further, even when the feature data cannot be clearly obtained or when mistaken data is mixed in, the effects of the mistaken data can be automatically alleviated by other correct feature data or constraints from the dynamic model and a reasonable solution can be obtained, so in principle this is a method of reproduction not using a time-consuming retrieval operation. As a result, it does not rely on a massive amount of combined calculations which proved to be a problem in the prior art.

Further, according to the present embodiment, it is possible to reproduce depth data without using a number of video cameras, but with just a single video camera.

A second embodiment of the three dimensional shape reproduction system of the present invention will be explained next.

This embodiment further shortens the calculation time of the above embodiment.

In the first embodiment, it is necessary to solve a simultaneous dynamic equation (differentiation equation) for three times the number of nodes used in the dynamic model in the reproduction of the three-dimensional shape and therefore there was still the problem of too much of an amount of calculation.

As a method of solving this problem, it may be considered to make use of the known method of an Eigenvalue analysis of the spring matrix in the dynamic model, making independent calculations for each mode of vibration, and obtaining a solution without solving the simultaneous equation.

This known method, however, results in a major change in the spring matrix when the object changes in shape (vibrates) a lot and makes it necessary to perform the Eigenvalue analysis sequentially. The amount of calculation involved cannot be ignored and as a result it was learned that this was not desirable for use for an object which changes in shape with relative motion, such as the human palm or fingers or the hand of an industrial robot.

From the above viewpoint, the present embodiment has as its object to enable calculation for each mode and thus shorten the calculation time by dividing the three-dimensional dynamic model of the object into partial regions with little change in shape.

Figure 15:
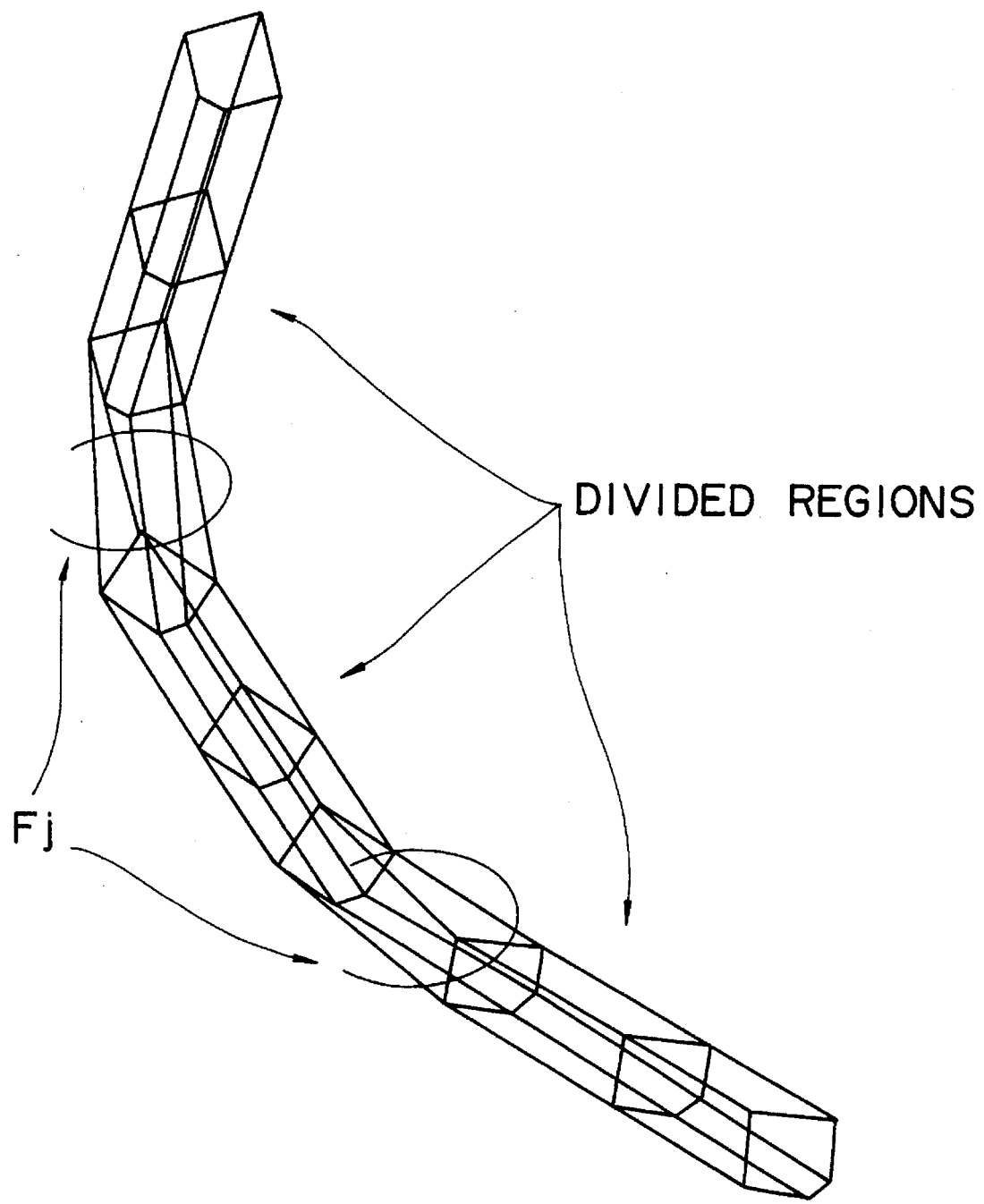
FIG. 15 is a view explaining the division of the portions of the object with little change in shape into partial regions in the present invention.

FIG. 15 is a view showing the division of part of the object used in the second embodiment into a plurality of divided regions.

Figure 16:
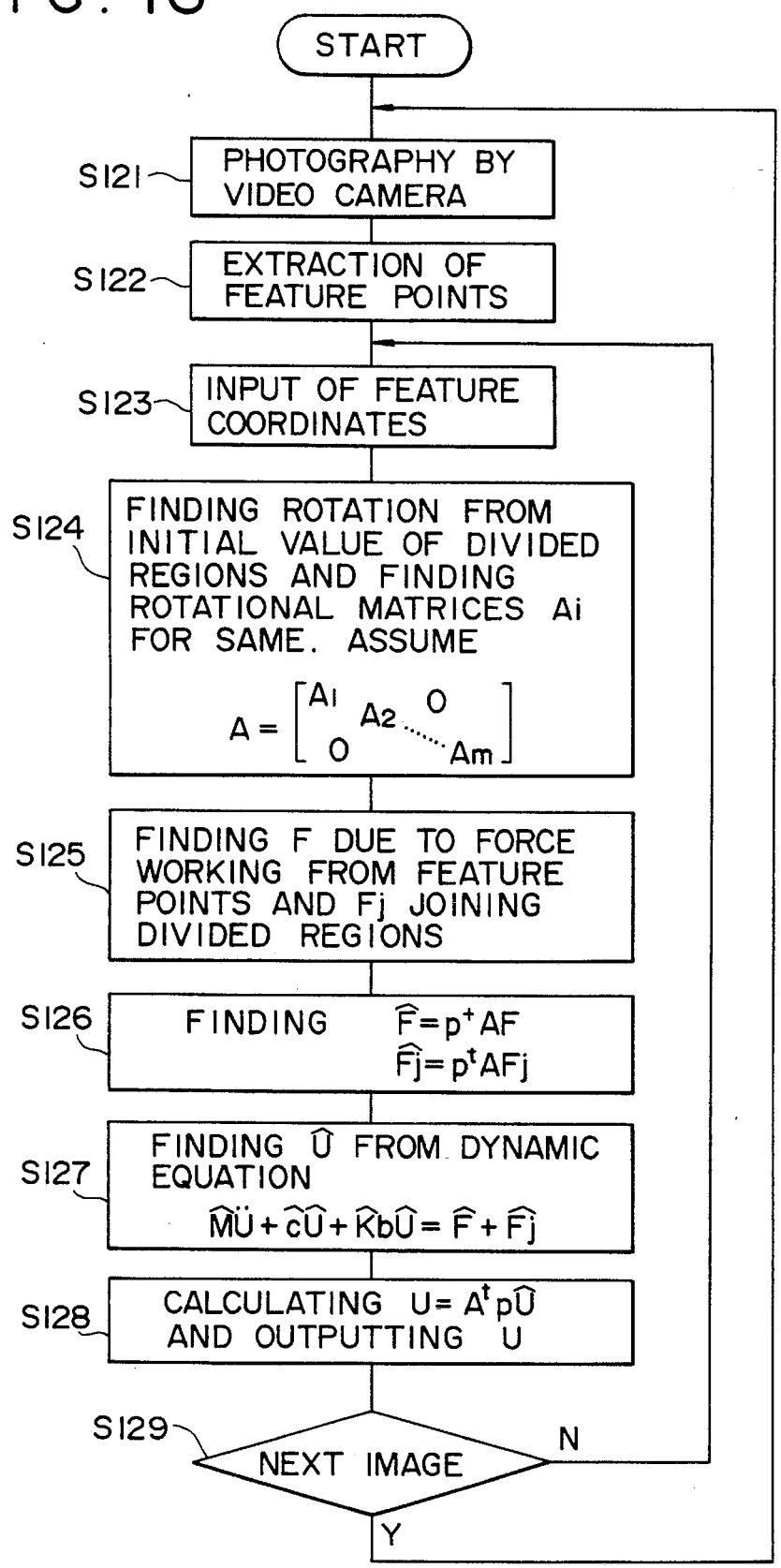
FIG. 16 is a flow chart showing the processing of the second embodiment of the image processing system shown in FIG. 11.

FIG. 16 is a flow chart of the processing for the operation of the image processing system of the second embodiment.

In the second embodiment too, the image processing system is of the same construction as that shown in FIG. 11. The photographic processing (step S121) in the two-dimensional image data input means 101 and the feature extraction processing (step S122) in the feature extraction means 103 are the same as in the processing shown in FIG. 13.

The content of the processing shown in steps S123 to S128 in the three-dimensional shape reproduction processing means 105 differs from that in the first embodiment.

Below, an explanation will be made of the operation of the three-dimensional shape reproduction in the second embodiment.

In the three-dimensional shape reproduction processing means 105, basically the dynamic equation shown by equation 5 is solved. Symbol F is the force vector applied to the model of the object. As mentioned above, it is a force vector including the nonlinear internal force vector $F_k$ and the external force vector $F_i$ obtained from the two-dimensional feature extraction coordinates. Therefore, in this embodiment too, equation 10 is solved. However, the method of solving it differs from the first embodiment, as explained above.

The object, as shown in FIG. 9, may be considered as consisting of partial regions in the human body, hand, etc. where the shape does not change, such as the legs, arms, fingers, etc., connected by joints. With this assumption, the divided regions in the spring matrix K are expressed by the m number of independent block matrices $K_1, K_2, \ldots, K_m$. The spring binding force corresponding to the joints connecting the block matrices is made $F_j$ and is transposed to the force vector F in the right side of equation 5.

That is, the term (KU) in equation 51 is expressed as shown in equation 11.

$$KU = K_b U - F_j \qquad (11)$$

However, $K_b$ of equation 51 is expressed by the block matrix of equation 12.

$$K_b = \begin{bmatrix} K1 & & O \\ & K2 & \\ O & & Km \end{bmatrix} \qquad (12)$$

As a result, equation 5 is expressed by equation 13.

$$M\ddot{U} + C\dot{U} + K_b U = F + F_j \qquad (13)$$

If the Eigenvalue analysis is performed on equation 13 and a known method is used to obtain ind the matrix P for diagonalizing the mass matrix M, the damping coefficient matrix C, and the stiffness matrix $K_b$ to M, C, and $K_b$, then it is possible to rewrite equation 13 as equation 14.

$$\hat{M}\ddot{\hat{U}} + \hat{C}\dot{\hat{U}} + \hat{K}_b \hat{U} = \hat{F} + \hat{F}_j \qquad (14)$$

Here, M, C, $K_b$, U, F, and $F_j$ are shown by the following equations:

$$\begin{aligned}
\hat{M} &= P^t M P \\
\hat{C} &= P^t C P \\
\hat{K}_b &= P^t K_b P \\
\hat{U} &= Pt U \\
\hat{F} &= Pt F \\
\hat{F}_j &= Pt F_j
\end{aligned} \qquad (15)$$

where, $P^t$ shows a transposed matrix of the matrix P.

When the object does not change in shape much, the stiffness matrix K does not change much and diagonalization is possible with the same matrix P, but when the object changes greatly along with time, it is necessary to perform the sequential Eigenvalue analysis again to obtain the new matrix P.

Therefore, if the block matrices $K_i$ in the divided regions are constant and are rotated by exactly $A_i$ each and if the mass matrix M and the damping coefficient matrix C are assumed to be constant matrices, then equation 16 may be obtained:

$$A = \text{diag}[A_1, A_2, \ldots A_m] \qquad (16)$$

The stiffness matrix $K_b$ after the rotation and change in shape is expressed by equation 17:

$$K_b = A^t K_b A \qquad (17)$$

The dynamic equation after the change in shape can be expressed as equation 18:

$$MU + CU + A^t K_b A U = F + F_j \qquad (18)$$

The rotational matrix A is a unitary matrix, so equation 14 may be rewritten to equation 15.

$$AMA^t AU + ACA^t AU + AA^t K_b AU = AF + AF_j \qquad (19)$$

The mass matrix M and the damping coefficient matrix C are constant matrices, so equation 19 can be expressed as equation 20.

$$MU' + CU' + K_b U' = F' + F_j' \qquad (20)$$

where, U, F, and F are expressed by the following equation:

$$\begin{aligned}
U' &= P^t A U \\
F' &= P^t A F \\
F_j' &= P^t A F_j
\end{aligned} \qquad (21)$$

Equation 20 is diagonalized, so is no longer a simultaneous equation and it is possible to find the node positions U for an object changing in shape at a high speed without convergence calculation.

The step S123 to step S128 in FIG. 16 shows the above-mentioned computation processing in the three-dimensional shape reproduction processing means 105.

Step S123: The three-dimensional shape reproduction processing means 5 receives as input the feature extraction coordinates from the feature extraction means 3.

Step S124: The three-dimensional shape reproduction processing means 105 finds the unitary matrix A shown in equation 16.

Step S125: The three-dimensional shape reproduction processing means 105 finds the force vector F due to the force acting from the feature points etc. and the force $F_j$ binding the divided regions.

Step S126: The three-dimensional shape reproduction processing means 105 performs transformation processing using the transposed matrix $P^t$ shown in equation 21.

Step S127: The three-dimensional shape reproduction processing means 105 solves the dynamic equation of equation 20. The dynamic equation of equation 20 is diagonalized, so is no longer a simultaneous equation and can be solved at a high speed without convergence calculation, it should be noted.

Step S128: The three-dimensional shape reproduction processing means 5 transforms the U found to the node position U and outputs the obtained node position U.

Step S129: The above-mentioned operation is repeated for the next frame.

In the above way, in the second embodiment, the stiffness matrix $K_b$ prepared by dividing the object into portions not changing in shape much is subjected to the Eigenvalue analysis in advance to find the Eigen matrix P and use is made of the rotational matrix A where the deviation from the initial states of the divided regions are calculated, so as to calculate F and $F_j$ and solve equation 20, whereby the node positions U' are found, and the node positions U are found from the node positions U' and the Eigen matrix P and rotational matrix A.

It is necessary to transfer the force vectors F and $F_j$ and the node positions U into F, $F_j$, and U by the Eigen matrix P and the rotational matrix A, but the amount of calculation involved is smaller compared with the method of solving the simultaneous equation shown in equation 5 as is and therefore higher speed processing becomes possible.

That is, in the second embodiment, the object is divided into partial regions with little change in shape, it is assumed that there is no change in the spring matrix in the partial regions, calculation is made possible with each mode, the forces due to the springs joining the partial regions are sequentially calculated, and the time for calculation for reproduction of the three-dimensional shape is shortened overall.

When working the image processing system of the present invention, it is possible to apply other processing in addition to the processing for operation of the feature extraction means 103 and the three-dimensional shape reproduction processing means 105 mentioned above.

For example, in the above-mentioned embodiment, illustration was made of the photographic data in the two-dimensional image data input means 101 for the two-dimensional data, but the same processing as in the above-mentioned embodiment may be performed even in the case of input of distance image data etc.

Figure 17:
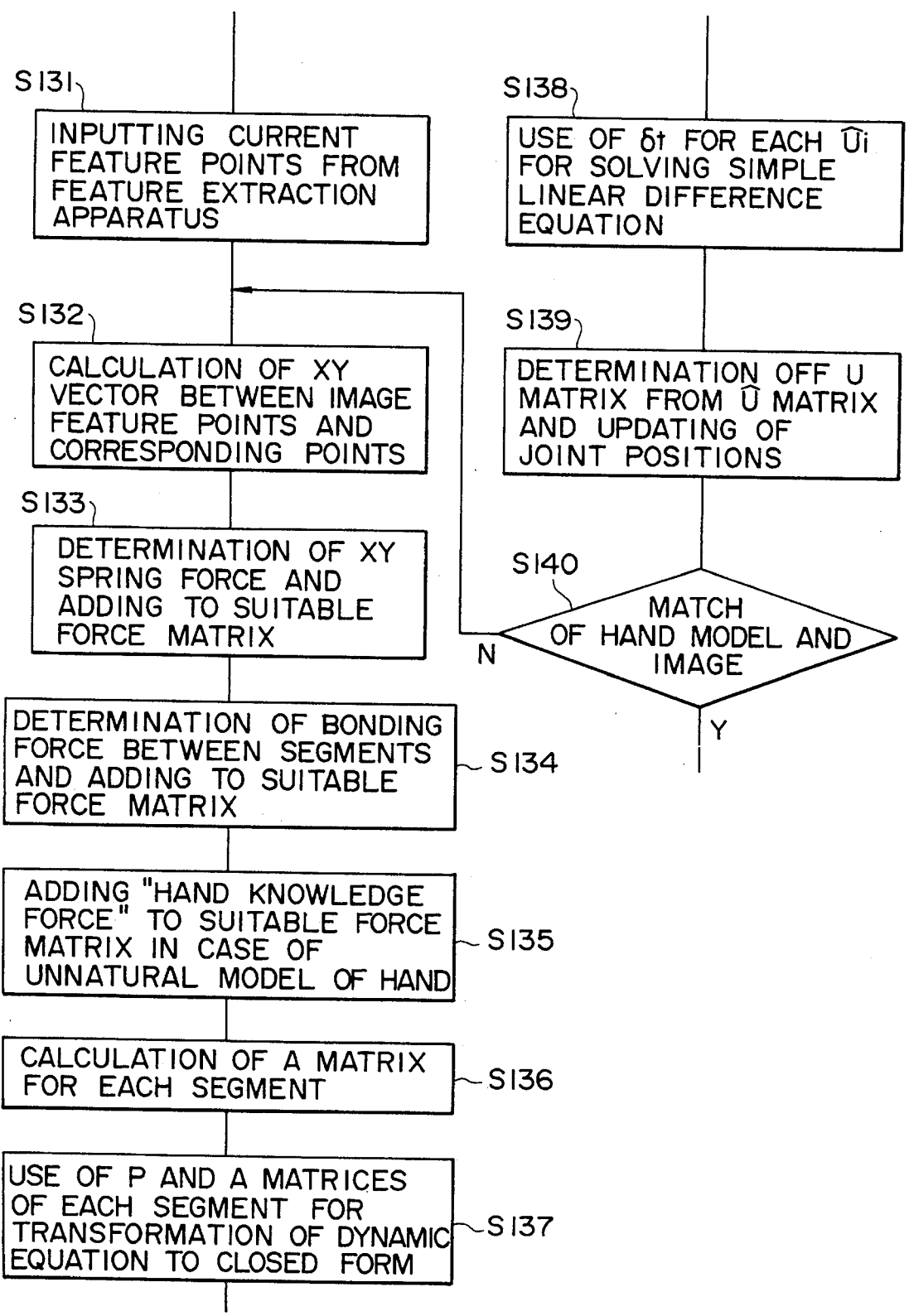
FIG. 17 is a flow chart explaining the method of image processing in the image processing system of the present invention in the case of the object being the human palm and fingers as a specific illustration of the image processing system shown in FIG. 11.

FIG. 17 is a flow chart showing the processing for reproduction of a three-dimensional shape in the case of assumption of use of the human palm and fingers as the object as a man-machine interface means as a specific example of application of the image processing apparatus of the present invention.

FIG. 18 is a view showing the results of analysis of the various states of the palm and fingers when performing processing for reproduction of a three-dimensional shape shown in FIG. 17.

FIG. 18a shows the results of extraction of features from the photographic data when the palm and the fingers are opened. The left side is a view of the extraction of the surface features, while the right side is a view of the extraction of the side features.

Below, from FIG. 18b to FIG. 18d, the front views and side views of the pinky, ring finger, middle finger, and index finger as bent are successively shown.

Below, the processing for the operation of the three-dimensional shape reproduction processing means 105 will be explained with reference to the flow chart shown in FIG. 17.

Step S131: The three-dimensional shape reproduction processing means 105 receives as input the current feature points from the feature extraction means 103.

Step S132: The three-dimensional shape reproduction processing means 105 calculates the force vector in the X,Y plane between the image feature point and the corresponding point.

Step S133: The three-dimensional shape reproduction processing means 105 decides on the X,Y spring force $F_i$ and applies it to the suitable force matrix.

Step S134: The three-dimensional shape reproduction processing means 105 decides on the binding force between segments and applies it to a suitable force matrix.

Step S135: In the case when the model of the hand is unnatural, a "hand knowledge force" is applied to the suitable force matrix in the three-dimensional shape reproduction processing means 105.

Step S136: The three-dimensional shape reproduction processing means 105 calculates the matrix P and the rotational matrix A for each segment.

Step S137: The three-dimensional shape reproduction processing means 105 transforms the dynamic equation to a dynamic equation of the closed type shown in equation 16 using the matrix P and the rotational matrix A for each segment.

Step S138: The three-dimensional shape reproduction processing means 105 solves the simple linear differential equation using the differential time $\delta t$ for each $U_i$.

Step S139: The three-dimensional shape reproduction processing means 105 decides on the node position matrix U from the node position matrix U and updates the joint positions of the fingers.

Step S140: The three-dimensional shape reproduction processing means 105 repeats the above processing until the hand model and image match.

The results of the above-mentioned computation processing are shown in FIG. 19 and FIG. 20.

Figure 19A:
FIGS. 19a to 19d are views showing the first results based on the embodiment of FIG. 17.

FIG. 19a gives the results of photography by the two-dimensional image data input means 101 when, as the shape of the hand serving as the object, the fingers are slightly bent.

Figure 19B:
Figure 19C:
Figure 19D:

FIGS. 19b to 19d are a top view, front view, and side view of the three-dimensional shape reproduced from the results of photography shown in FIG. 19a through the feature extraction means 103 and the three-dimensional shape reproduction processing means 105.

Figure 20A:
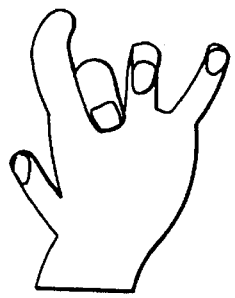
FIG. 20a to 20d are views showing the second results based on the embodiment of FIG. 17.
Figure 20B:
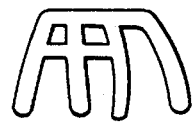
Figure 20C:
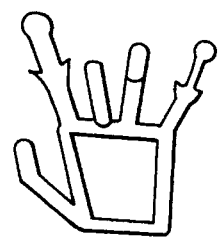
Figure 20D:
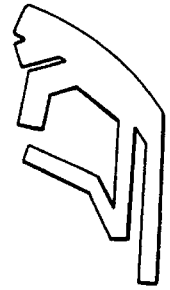

FIG. 20a gives the results of photography by the two-dimensional image data input means 101 when, as the shape of the hand serving as the object, the middle finger is bent, the tip of the index finger is slightly bent, the ring finger is also slightly bent, and the tip of the pinky is somewhat bent. FIGS. 20b to 20d are a top view, front view, and side view of the three-dimensional shape reproduced from the results of photography shown in FIG. 20a through the feature extraction means 103 and the three-dimensional shape reproduction processing means 105.

FIG. 19b to FIG. 19d and FIG. 20b to FIG. 20d clearly differ in the reproduced data. The difference of the motion of the hand can be utilized to use the human hand as a man-machine interface means.

The image processing system of the present invention is not limited to use for the human hand etc. As the object, use may be made, for example, of the hand of an industrial robot. The image processing system may be used for the reproduction of a three-dimensional shape for confirmation of the state of gripping of the same etc.

The feature extraction means 103 and the three-dimensional shape reproduction processing means 105 shown in FIG. 11 differ in function and therefore were shown as separate components, but usually the feature extraction means 103 and the three-dimensional shape reproduction processing means 105 are realized using computers, so can be realized as one unit in the same computer. Of course, it is also possible to realize the feature extraction means 103 and the three-dimensional shape reproduction processing means 105 by different microcomputers performing dispersed processing.

As explained above, according to the present invention, it is possible to reproduce a three-dimensional shape from two-dimensional image data of an object by adding shape-changing force to a dynamic equation.

Further, according to the present invention, it is possible to reproduce a three-dimensional shape from two-dimensional image data of an object at a high speed by processing the object dividing it into portions with little change in shape or no change in shape.

FIG. 21 is a view showing another three dimensional shape reproduction system, similar to the tree dimensional shape reproduction system shown in FIG. 11. The three dimensional shape reproduction system includes the two dimensional image data input means 101, a feature extraction means 103A, and the three dimensional shape reproduction processing means 105. The feature extraction means 103A is comprised of the edge detection unit 4, the Hough Transformation unit 6, the probabilistic search unit 8, and the clustering unit 10, shown in FIG. 1. The clustering results can be used as the feature of the tree dimensional shape reproduction.

The three dimensional shape reproduction system can be applied to a variety of reproduction of objects not only the reproduction of the three dimensional shape of the human hand but also the reproduction of the three dimensional shape of the objects such as a robot hand.

Figure 22:
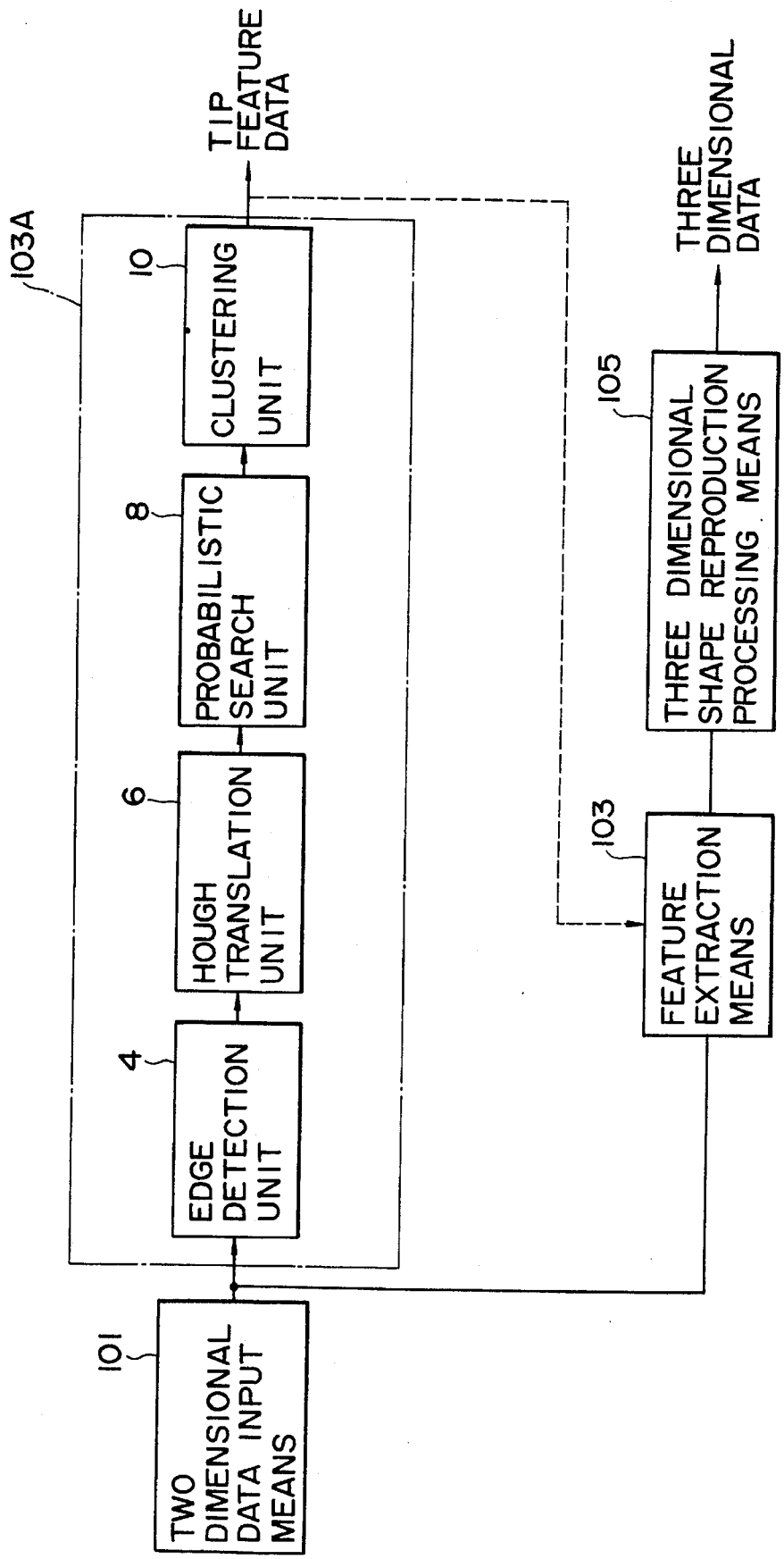
FIG. 22 is a view illustrating an image processing system of a fourth embodiment of the present invention.

FIG. 22 is a view showing an image data processing system. The image data processing system comprises the two dimensional image data input means 101, the means 103A for finding finger tips of the human hand, the feature extraction means 103 and the three dimensional shape reproduction means 105. In this data processing system, the two dimensional image data input means 101 such as the CCD camera photographs the human hand to provide a two dimensional image data, the means 103A outputs the finger tip data, at the same time, the three dimensional shape reproduction processing means 105 outputs the three dimensional shape data.

The output from the means 103A can be applied to the feature extraction means 103.

Many widely different embodiments of the present invention may be constructed without departing from the spirit and scope of the present invention, and it should be understood that the present invention is not restricted to the specific embodiments described above.

I claim:

1. A method for detecting fingers of a human hand, comprising the steps of:

reading the hand and outputting image data of the hand in a form of two-dimensional pixel data;

detecting edges of the hand on the basis of said pixel data;

determining image lines as lines having the greatest number of edge pixels;

determining the orientation line of the hand as the line having the average slope and Y intercept of said image lines;

searching the pixel data for edge pixels wherein the search is statistically biased in a direction parallel to the orientation line; and clustering edge pixels defining said finger tips;

wherein said steps of determining image lines and determining the orientation line include transforming a rectilinear coordinate system of said detected edges into a polar coordinate system, accumulating edge points in the parameter space, and obtaining the highest accumulated values for each of said lines to determine said orientation line of the hand.

2. A method of detecting fingers of a human hand comprising the steps of:

reading the hand and outputting image data of the hand in a form of two-dimensional pixel data;

detecting edges of the hand on the basis of said pixel data;

determining image lines as lines having greatest number of edge pixels;

determining the orientation line of the hand as the line having the average slope and Y intercept of said image lines;

searching the pixel data for edge pixels wherein the search is statistically biased in a direction parallel to the orientation line; and clustering edge pixels defining said finger tips;

wherein said clustering step includes choosing arbitrary locations in a cluster, assigning the termination pixel of each search to a cluster location of the basis of a least euclidean distance, and determining new cluster locations by computing the centroid of all said pixels assigned to the cluster.

3. A method of extracting features of an object, comprising the steps of:

photographing the object and outputting image data of the object in a form of two-dimensional pixel data;

detecting edges of the object on the basis of said pixel data;

determining image lines as lines having greatest number of edge pixels;

determining the orientation line of the hand as the line having the average slope and Y intercept of said image lines;

searching the pixel data for edge pixels wherein the search is statistically biased in a direction parallel to the orientation line; and clustering edge pixels defining said finger tips;

wherein said steps of determining image lines and the determining the orientation line include transforming a rectilinear coordinate system of said detected edges into a polar coordinate system, accumulating edge points in the parameter space, and obtaining the highest accumulated values for each of said lines to determine said orientation line of the object.

4. A method of extracting features of an object, comprising the steps of:

photographing the object and outputting image data of the object in a form of two-dimensional pixel data;

detecting edges of the object on the basis of said pixel data;

determining image lines as lines having greatest number of edge pixels;

determining the orientation line of the hand as the line having the average slope and Y intercept of said image lines;

searching the pixel data for edge pixels wherein the search is statistically biased in a direction parallel to the orientation line; and clustering edge pixels defining said finger tips;

wherein said clustering step includes choosing arbitrary locations in a cluster, assigning the termination pixel of each search to a cluster location of the basis of a least euclidean distance, and determining new cluster locations by computing the centroid of all of said pixels assigned to the cluster.

* * * * *